(12) United States Patent
Senoo

(10) Patent No.: US 8,854,495 B2
(45) Date of Patent: Oct. 7, 2014

(54) IMAGE PICKUP APPARATUS, METHOD FOR CONTROLLING FLICKER AND COMPUTER READABLE MEDIUM

(75) Inventor: Hidemitsu Senoo, Osaka (JP)

(73) Assignee: KYOCERA Corporation, Kyoto (JO)

( * ) Notice: Subject to any disclaimer, the term of this patent is extended or adjusted under 35 U.S.C. 154(b) by 908 days.

(21) Appl. No.: 12/506,484

(22) Filed: Jul. 21, 2009

(65) Prior Publication Data

US 2010/0026820 A1 Feb. 4, 2010

(30) Foreign Application Priority Data

Jul. 29, 2008 (JP) ................. 2008-195357

(51) Int. Cl.
| | | |
|---|---|---|
| H04N 9/73 | (2006.01) | |
| H04N 5/235 | (2006.01) | |
| H04N 5/228 | (2006.01) | |
| H04N 5/232 | (2006.01) | |
| H04N 5/353 | (2011.01) | |

(52) U.S. Cl.
CPC ......... H04N 5/23248 (2013.01); H04N 5/2357 (2013.01); H04N 5/23267 (2013.01); H04N 5/23254 (2013.01); H04N 5/353 (2013.01)
USPC .................. 348/226.1; 348/222.1; 348/208.12

(58) Field of Classification Search
CPC .......................... H04N 5/2357; H04N 5/23248
USPC ............ 348/226.1, 208.12, 208.99, 362, 363, 348/255, 221.1, 297
See application file for complete search history.

(56) References Cited

U.S. PATENT DOCUMENTS

| | | | | |
|---|---|---|---|---|
| 6,778,210 B1 * | 8/2004 | Sugahara et al. | .......... | 348/208.4 |
| 7,034,870 B2 * | 4/2006 | Nagaoka et al. | .......... | 348/228.1 |
| 7,705,893 B2 * | 4/2010 | Kinoshita | .................. | 348/226.1 |
| 2005/0046704 A1 * | 3/2005 | Kinoshita | .................. | 348/226.1 |
| 2006/0290797 A1 * | 12/2006 | Tanaka et al. | ................. | 348/297 |

FOREIGN PATENT DOCUMENTS

JP 2001-086398 3/2001

* cited by examiner

*Primary Examiner* — Ahmed A Berhan
(74) *Attorney, Agent, or Firm* — Procopio, Cory, Hargreaves & Savitch LLP

(57) ABSTRACT

An image pickup apparatus and method operable to reduce flicker is disclosed. A power supply frequency is detected, and a shutter speed is changed. A changed shutter speed value is slower than a calculated shutter speed and that is an integral multiple of $1/(2f)$, where "f" represents the power supply frequency. One or more still images are captured at the changed shutter speed, and an electronic hand-shake correction is performed in accordance with the captured still images.

10 Claims, 5 Drawing Sheets

1

IMAGE PICKUP APPARATUS, METHOD FOR CONTROLLING FLICKER AND COMPUTER READABLE MEDIUM

CROSS-REFERENCE TO RELATED APPLICATION

The present application claims priority under 35 U.S.C. §119 to Japanese Patent Application No. 2008-195357, filed on Jul. 29, 2008, entitled "IMAGE PICKUP APPARATUS, METHOD OF CONTROLLING FLICKER AND PROGRAM OF CONTROLLING FLICKER". The content of which is incorporated herein by reference herein in its entirety.

FIELD OF THE INVENTION

Embodiments of the present invention relate generally to image pickup apparatuses, and more particularly relate to image pickup apparatuses which reduce a periodical noise or flicker in an image.

BACKGROUND

In the past, image pickup apparatuses have used an electronic correction function for correcting shaking (hand-shaking) when the image pickup apparatus is held in a person's hand. Such an image pickup apparatuses control a shutter speed (exposure time) and an analog gain. The analog gain indicates to what extent a signal of an image captured at the shutter speed should be amplified. Accordingly, a preview image and a shake-corrected still image can have the same brightness. To reduce image shake, when a user presses a shutter-button, a terminal captures a still image at a shutter speed faster than a shutter speed calculated by an auto-exposure unit at the time of preview. In this manner, a still image is captured quickly reducing motion from the shake captured in the image, and a shake-corrected still image can be obtained.

Cutting the shutter time decreases image brightness, so in order to prevent a difference in brightness between the preview image and a shake-corrected still image, analog gain is amplified. The analog gain is amplified more than during the preview of the image, to amplify the analog image signal, and thus maintain image brightness at the same level. However, amplification of the analog gain causes random noise, thereby degrading the image quality. The random noise can be removed by capturing a plurality of still images and combining the captured still images.

The above-described countermeasures against random noise have been used; however, few countermeasures have been taken against flicker. When an image is taken using an image pickup apparatus when all or part of the illumination for the subject of the image is from a periodic light source, the image may have periodic bright and dark patterns across the image. A fluorescent lamp is the most common example of a source of periodic light. A ballast (i.e., an electrical power control device) of a fluorescent lamp can produce periodic frequencies in the intensity of light output of the fluorescent lamp. The periodic frequencies of the fluorescent illumination can create aliasing effects with the image scanning synchronization frequency of the image pickup apparatus. This effect may be amplified when a plurality of still images are taken at fixed time intervals (i.e., periodically) to correct for random noise.

Thus, when flicker appears in a captured still image, even if random noise is removed from the image, the image may still be unclear. Thus, there is a need for reducing flicker appearing in an image captured using an electronic hand-shake correction function.

SUMMARY

An image pickup apparatus and method operable to reduce flicker is disclosed. A power supply frequency is detected, and a shutter speed is changed. A changed shutter speed is shorter than a calculated shutter speed and is an integral multiple of $1/(2f)$, where "f" represents the power supply frequency. One or more still images are captured at the changed shutter speed, and an electronic hand-shake correction is performed in accordance with the captured one or more still images.

A first embodiment comprises an image pickup apparatus. The apparatus comprises an image pick up element operable to capture a plurality of still images at a shutter speed to obtain captured images, and a determination unit operable to detect a power supply frequency. The apparatus further comprises an auto exposure unit operable to calculate a calculated shutter speed based on the relationship $N/(2f)$, where N is an integer and f is the power supply frequency. The apparatus also comprises a setting unit operable to set the shutter speed to a value shorter than the calculated shutter speed in response to a predetermined user operation, if the calculated shutter speed is longer than or equal to a predetermined value.

A second embodiment comprises a method for reducing flicker. The method comprises detecting a power supply frequency, and obtaining a calculated shutter speed based on the relationship $N/(2f)$, where N is an integer; and f is the power supply frequency. The method further comprises setting a shutter speed to a value shorter than the calculated shutter speed, if the calculated shutter speed is longer than or equal to a predetermined value, and capturing one or more still images at the shutter speed to obtain captured images.

A third embodiment comprises a computer readable medium for reducing flicker. The computer readable medium comprises program code for detecting a power supply frequency, and obtaining a calculated shutter speed based on the relationship $N/(2f)$, where N is an integer; and f is the power supply frequency. The computer readable medium further comprises program code for setting a shutter speed to a value shorter than the calculated shutter speed, if the calculated shutter speed is longer than or equal to a predetermined value, and capturing one or more still images at the shutter speed to obtain captured images.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, image processing in a cell phone camera. Embodiments of the invention, however, are not limited to such image processing applications, and the techniques described herein may also be utilized in other optical applications. For example, embodiments may be applicable to a digital still camera, a Personal Digital Assistant (PDA) camera, an image inspection apparatus, an industrial camera used for automatic control, an in-vehicle monitoring camera, and the like.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

In photography, shutter speed is a common term used to discuss exposure time, the effective length of time a shutter is open; total exposure is proportional to this exposure time, or duration of light reaching the film or image sensor. As described herein, "preview" means a predetermined user operation. For example, the operation may be taking an image with a shutter speed which is successively calculated by an auto exposure unit during a time in which no image is captured. Preview may be activated by holding the shutter button down to display the image on the screen.

Figure 1:
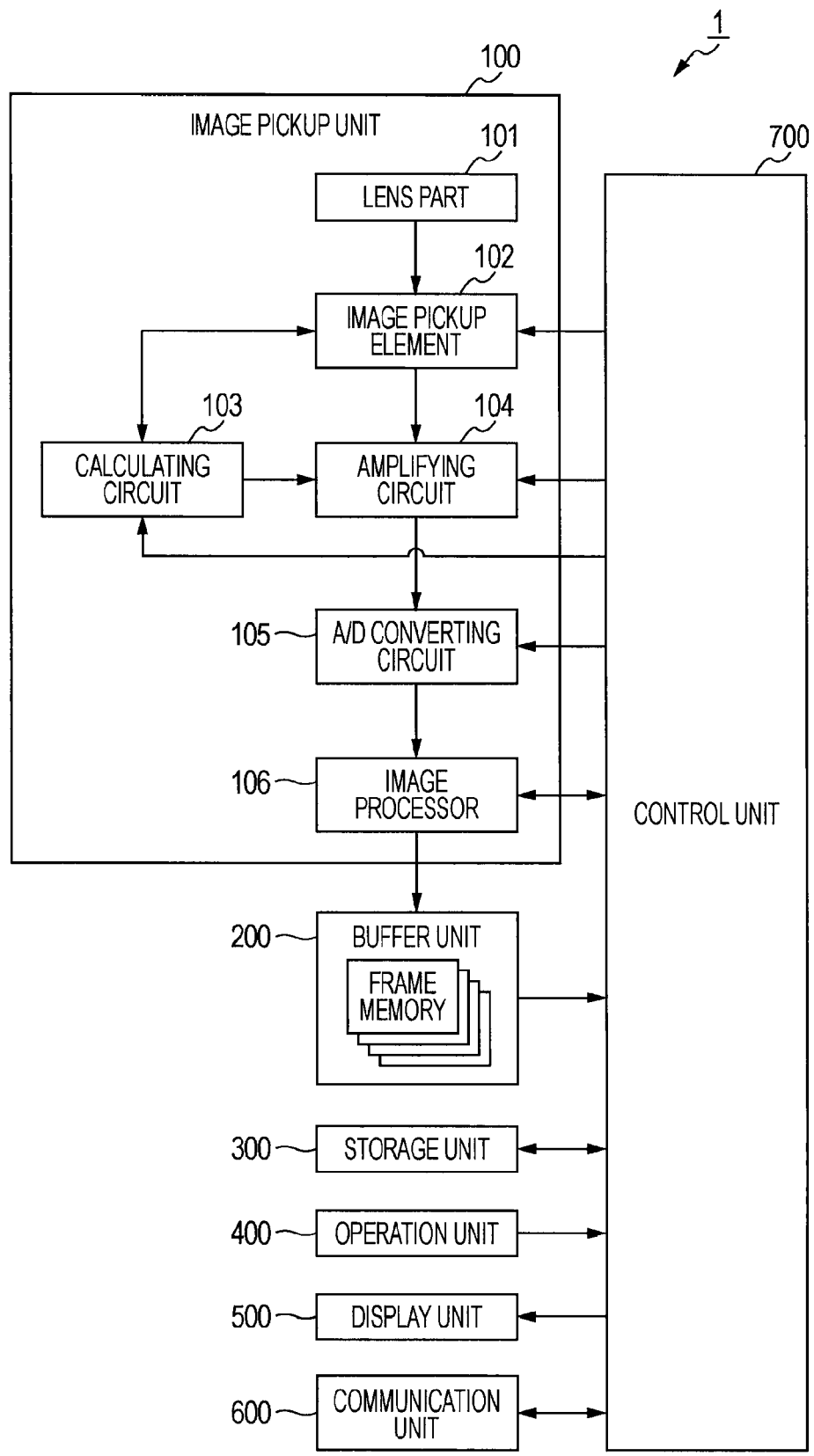
FIG. 1 illustrates an exemplary schematic functional block diagram of a cellular phone.

FIG. 1 illustrates an exemplary functional schematic block diagram of a cellular phone 1. A cell phone camera is explained as an example of an image pickup apparatus according to the present embodiment. The cell phone 1 includes an image pickup unit 100, a buffer unit 200, a storage unit 300, an operating unit 400, a display unit 500, a communication unit 600, and a control unit 700.

The image pickup unit 100 may generally comprise: a lens part 101, an image pickup element 102, a calculating circuit 103, an amplifying circuit 104, an analog-digital (A/D) converting circuit 105 and an image processor 106.

The image pickup element 102 may receive light after it passes through the lens part 101 and may include Charge Coupled Device (CCD) or Complementary Metal-Oxide Semiconductor (CMOS). The image pickup element 102 transforms an image of an object taken and formed by the lens part 101 into an image signal and outputs the image signal to the calculating circuit 103 and to the amplifying circuit 104.

During a preview of the image, a shutter speed of the image pickup element 102 is sequentially set by the calculating circuit 103, and the image pickup element 102 sequentially captures images at the set shutter speed. Meanwhile, at the time of capturing a still image in a case where hand-shake correction is performed, the shutter speed is set by the control unit 700, and the image pickup element 102 captures a plurality of images (i.e., four images) at the shutter speed set (set shutter speed) by the control unit 700. However, if the hand-shake correction is not performed (even when a still image is captured), the shutter speed is set by the calculating circuit 103, and the image pickup element 102 captures a single image at the set shutter speed. In this document, "image capturing" means capturing an image in response to a shutter-pressing operation performed by a user. A related signal in response to a shutter-pressing operation performed by a user is received by the image pickup unit 100.

The calculating circuit 103 may comprise an auto-exposure function. Specifically, the calculating circuit 103 calculates the shutter speed of the image pickup element 102 in accordance with image signals sequentially received from the image pickup element 102, and the calculated shutter speed is set in the image pickup element 102. In addition, the calculating circuit 103 calculates the analog gain (amplification factor) to be applied to an image signal, and sets the calculated analog gain in an amplifying circuit 104. However, if a notification indicating that execution of electronic hand-shake correction is necessary is received from the control unit 700, the calculating circuit 103 prevents the shutter speed and the analog gain from being set individually, since the shutter speed and the analog gain are to be set by the control unit 700.

The amplifying circuit 104 receives the set analog gain from the calculating circuit 103 or from the control unit 700. After electrically amplifying an image signal received from the image pickup element 102 with the received analog gain, the amplifying circuit 104 transmits the amplified image signal to an analog-to-digital (A/D) converting circuit 105.

The A/D converting circuit 105 converts the image signal (analog image signal) received from the amplifying circuit 104 into a digital signal, and transmits the converted image signal to the image processor 106.

The image processor 106 performs white balance control, complementing processing, and the like in accordance with the analog-to-digital converted image signal received from the A/D converting circuit 105 to generate image data. Then, the image processor 106 transmits the generated image data to a display controller 709 as explained in more detail below in the context of discussion of FIG. 2, of the control unit 700. If the control unit 700 determines that execution of electronic hand-shake correction is necessary, the image processor 106 stores the generated image data in the buffer unit 200. However, if the controller 700 determines that execution of electronic hand-shake correction is not necessary, the image processor 106 transmits the generated image data to a writing part 708 as explained in more detail below in the context of discussion of FIG. 2.

The buffer unit 200 may comprise a frame memory group, which is constituted by dedicated memories for temporarily storing captured images (for one frame). The image processor 106 inputs a plurality of pieces of captured image data captured by the image pickup element 102 to individual frame memories, and the plurality of pieces of captured image data are stored in the individual frame memories. The buffer unit 200 comprises a storage area sufficient for storing at least four pieces of still image data in this example.

The storage unit 300 may comprise a storage medium such as a secure digital (SD) memory card. Still image data captured by the image pickup element 102 and still image data that has been subjected to electronic hand-shake correction, which are received from the writing part 708, are stored in the storage medium. The storage unit 300 is operable to store various kinds of data used for various processes of the mobile phone 1. In practical embodiments, the storage unit 300 may comprise, for example, a non-volatile memory or storage device (non-volatile semiconductor memory, hard disk device, optical disk device, and the like), a random access storage device (for example, SRAM, DRAM), or any other form of storage medium known in the art. For example, the storage unit 300 may store a computer program which is executed by the control unit 700, a threshold value to determine whether an execution of electronic hand-shake correction is necessary, the upper limits of the shutter speed and the analog gain, and the like stored in the ROM. The storage unit 300 may be coupled to the control unit 700 such that the control unit 700 can read information from and write information to storage unit 300. As an example, the control unit 700 and storage unit 300 may reside in their respective ASICs. The storage unit 300 may also be integrated into the control unit 700. In an embodiment, the storage unit 300 may include a cache memory for storing temporary variables or other intermediate information during execution of instructions to be executed by the control unit 700. The storage unit 300 may use the non-volatile memory for storing instructions to be executed by the control unit 700.

The operation unit 400 may comprise keys that can be pressed, such as numeric keys, a set key, a menu key, and a shutter button, so that an operation from a user can be received. The operation unit 400 outputs a detection signal from a key or a button pressed by the user to the control unit 700.

The display unit 500 may comprise an image display device such as, without limitation, a light emitting diode (LED) display, a liquid crystal display (LCD), or an organic EL display (OLED). The display unit 500 displays images and the like sequentially captured by an image pickup unit 100 and received from the display controller 709.

A communication unit 600 may comprise a transmitting/receiving circuit including a modulator and a demodulator. The communication unit 600 can communicate with a wireless or wired communication network (not shown) via a suitable communication link. The communication unit 600 communicates with the communication network and transmits and/or receives various kinds of data such as the still image data, and the like, via an antenna.

The control unit 700 controls overall operation of the mobile phone 1. For example the control unit 700 may control transmitting/receiving of signals by the communication unit 600, displaying an image in the display unit 500 etc. The control unit 700 may control operations of the mobile phone 1 so that processes of the mobile phone 1 are suitably performed. These processes may include, without limitation, determination of the commercial power supply frequency, execution of electronic hand-shake correction, setting a shutter speed, reducing flicker, displaying of images received from the image processor 106 on the display unit 500, image communication performed over a communication network, and the like. The control unit 700 may comprise a computer (microprocessor) or another processor for performing a process based on a program (operating system, application program, etc.) stored in the storage unit 300. The control unit 700 may read instruction code sequentially from programs such as the operating system and the application program which are stored in the storage unit 300, and perform the programs. The control unit 700 may also perform procedures corresponding to operations of the operation unit 400 such as activating a key.

Figure 2:
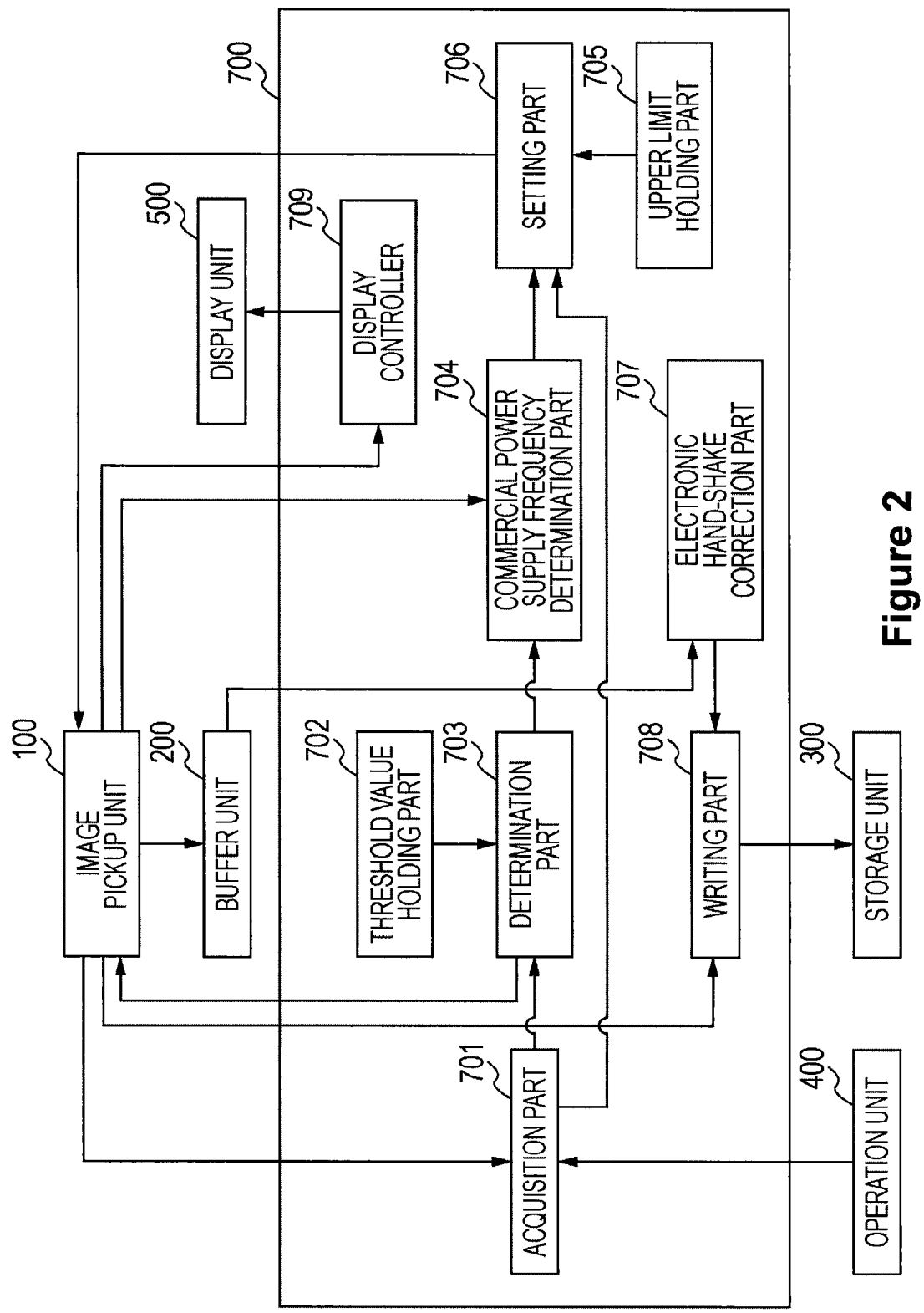
FIG. 2 illustrates an exemplary schematic functional block diagram showing detail of an exemplary control unit of the cellular phone of FIG. 1.

FIG. 2 illustrates a schematic functional block diagram showing detail of an exemplary control unit 700 of the cellular phone 1. The control unit 700 may comprise an acquisition part 701, a threshold value holding part 702, a determination part 703, a commercial power supply frequency determination part (determination unit) 704, an upper limit holding part 705, a setting part (setting unit) 706, an electronic hand-shake correction part (correcting unit) 707, the writing part 708, and the display controller 709. Functions of the parts 701 to 709 are implemented in accordance with a computer program.

When receiving a detection signal from the operation unit 400, indicating that the shutter button was pressed by the user, the acquisition part 701 acquires the shutter speed and the analog gain from the image pickup element 102 and the amplifying circuit 104, respectively. The acquisition part 701 transmits the acquired shutter speed and analog gain to the setting part 706, and transmits the acquired shutter speed to the determination part 703.

The threshold value holding part 702 holds a threshold value (hand-shake threshold value) to be used for determining whether or not execution of electronic hand-shake correction is necessary. Specifically, the threshold value is less than (that is, shorter than) $1/f$. In Japan, a commercial power supply frequency $f$ may be either 50 Hz or 60 Hz. Hence, a shutter speed value less than $1/f$ can be stored in advance as a threshold value.

The determination part 703 reads the threshold value from the threshold value holding part 702, and determines, on the basis of the read threshold value and the shutter speed received from the acquisition part 701, whether or not the execution of electronic hand-shake correction is necessary. Then, the determination part 703 transmits the determination result to the image processor 106. In a case where it is determined that the execution of electronic hand-shake correction is necessary, the determination part 703 notifies the calculating circuit 103 and the commercial power supply frequency determination part 704 of the necessity of the execution of electronic hand-shake correction.

When receiving the notification from the determination part 703, the commercial power supply frequency determination part 704 determines, in accordance with a captured image received from the image pickup unit 100, whether the commercial power supply frequency $f$ at the position where the cellular phone 1 is located is, for example but without limitation, 50 Hz or 60 Hz. The process of determining the commercial power supply frequency is explained below in the context of FIGS. 4 and 5. Then, the commercial power supply frequency determination part 704 transmits the determination result to the setting part 706.

The upper limit holding part 705 holds the upper limits of the shutter speed and the analog gain.

The setting part 706 reads the upper limits of the shutter speed and the analog gain from the upper limit holding part 705, and calculates the shutter speed and the analog gain to be set for capturing of a still image in accordance with the read upper limits of the shutter speed and the analog gain, the shutter speed and the analog gain received from the acquisition part 701, and the determination result received from the commercial power supply frequency determination part 704. Then, the setting part 706 transmits the set shutter speed to the image pickup element 102 and transmits the calculated analog gain to the amplifying circuit 104.

The electronic hand-shake correction part (correcting unit) 707 sequentially reads still images (e.g., four images) stored in the buffer unit 200, and performs electronic hand-shake correction on the read still images to generate a corrected still image. Then, the electronic hand-shake correction part 707 transmits the corrected still image to the writing part 708.

The writing part 708 writes still image data received from the image processor 106 and the electronic hand-shake correction part 707 to the storage unit 300.

The display controller 709 displays, on the display unit 500, captured images sequentially received from the image processor 106 at the time of preview.

An operation of the cellular phone 1 at the time of capturing a still image will now be explained. When the cellular phone 1 receives the result of detection of pressing of the shutter button by the user at the time of preview, in a case where the shutter speed set in the image pickup element 102 is sufficiently short, the cellular phone 1 captures a still image at the set shutter speed and stores the captured image without performing electronic hand-shake correction. In this case, since rounding of an image caused by electronic hand-shake correction does not occur, a sharp still image can be obtained.

However, if the shutter speed set in the image pickup element 102 is not sufficiently short, a new shutter speed is set. Four still images are captured at the set shutter speed, and electronic hand-shake correction is performed. Here, if the shutter speed set in the image pickup element 102 is equal to or longer than 1/f, flicker can be reduced by setting the new shutter speed to a speed value shorter than half the shutter speed and that is an integral multiple (N) of 1/2f, where N is an integer and f is a frequency such as the power supply frequency.

Figure 3:
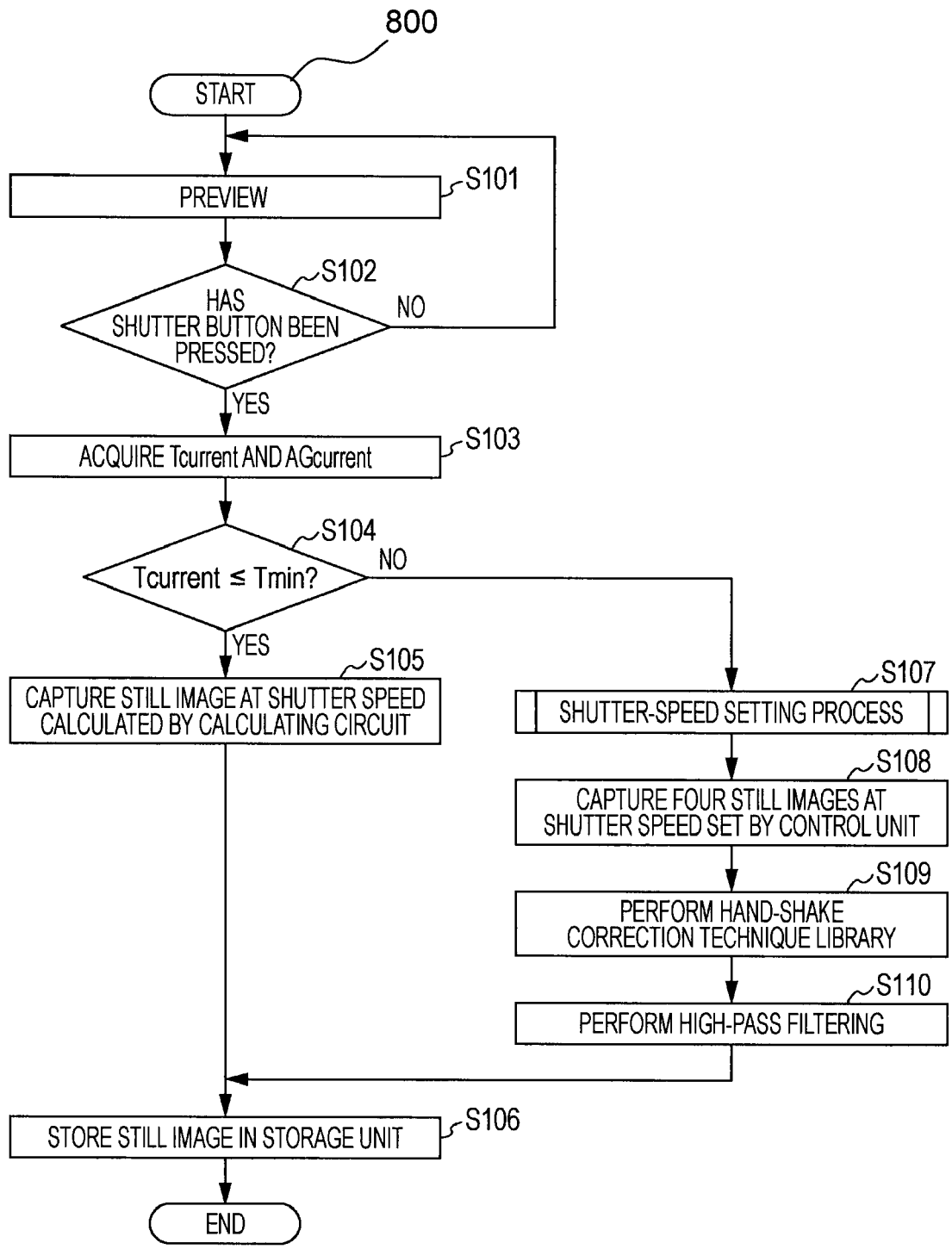
FIG. 3 illustrates a flowchart showing an exemplary process for capturing a still image in a cellular phone.

FIG. 3 illustrates a flowchart showing an exemplary process 800 for capturing a still image in a cellular phone according to an embodiment of the invention. The various tasks performed in connection with process 900 may be performed by software, hardware, firmware, or any combination thereof. For illustrative purposes, the following description of process 800 may refer to elements mentioned above in connection with FIGS. 1-2. In practical embodiments, portions of process 800 may be performed by different elements of the described device, e.g., the image pick up element 100, the buffer unit 200, the storage unit 300, the operation unit 400, the display unit 500, the communication unit 600, and the control unit 700. Process 800 may include any number of additional or alternative tasks. The tasks shown in FIG. 3 need not be performed in the illustrated order, and process 800 may be incorporated into a more comprehensive procedures or processes having additional functionality not described in detail herein.

In the embodiment shown in FIG. 3, "Tcurrent" represents a variable showing the shutter speed set in the image pickup element 102 when the shutter button is pressed, and "AGcurrent" represents a variable showing the analog gain set in the amplifying circuit 104 when the shutter button is pressed. In addition, "Tmin" represents a threshold value which is less than (that is, shorter than) 1/f and is used for a determination as to the necessity of execution of electronic hand-shake correction. In this case, the threshold value "Tmin" is, for example, 1/2222.

At the time of preview (in step S101), if it is determined that pressing of the shutter button by the user has been detected (YES branch of inquiry step S102), the acquisition part 701 acquires "Tcurrent" from the image pickup element 102 and "AGcurrent" from the amplifying circuit 104 (step S103).

If it is determined that "Tcurrent" is shorter than or equal to "Tmin" (YES branch of inquiry step S104), the image pickup unit 100 captures a still image at the shutter speed calculated by the calculating circuit 103 (step S105). If "Tcurrent" becomes sufficiently short, a degradation in image quality caused by hand shake is reduced, and the analog gain is also reduced. Thus, the influence of random noise can be reduced. Therefore, a sufficiently high-quality still image can be captured, without removing random noise by capturing four still images and performing electronic hand-shake in accordance with the captured four still images.

The writing part 708 then stores the captured still image in the storage unit 300 (step S106).

However, if it is determined that "Tcurrent" is longer than "Tmin" (NO branch of inquiry step S104), a shutter-speed setting process is performed (step S107) as explained in more detail in the context of discussion of FIGS. 4 and 5 below.

The image pickup unit 100 captures, for example, four still images at the shutter speed set by the shutter-speed setting process (step S108).

The electronic hand-shake correction part (correcting unit) 707 performs a hand-shake correction technique library on the captured four still images so that electronic hand-shake correction can be performed (step S109). Specifically, the feature of an object included in each of the still images is detected. If the position of the object differs in the individual still images, the displacement in the position is corrected and the still images are combined to form a single still image.

Then, high-pass filtering is performed (step S110), and edge enhancement is performed. The writing part 708 stores the still image that has been subjected to high-pass filtering and stored in the storage unit 300 (step S106).

Figure 4:
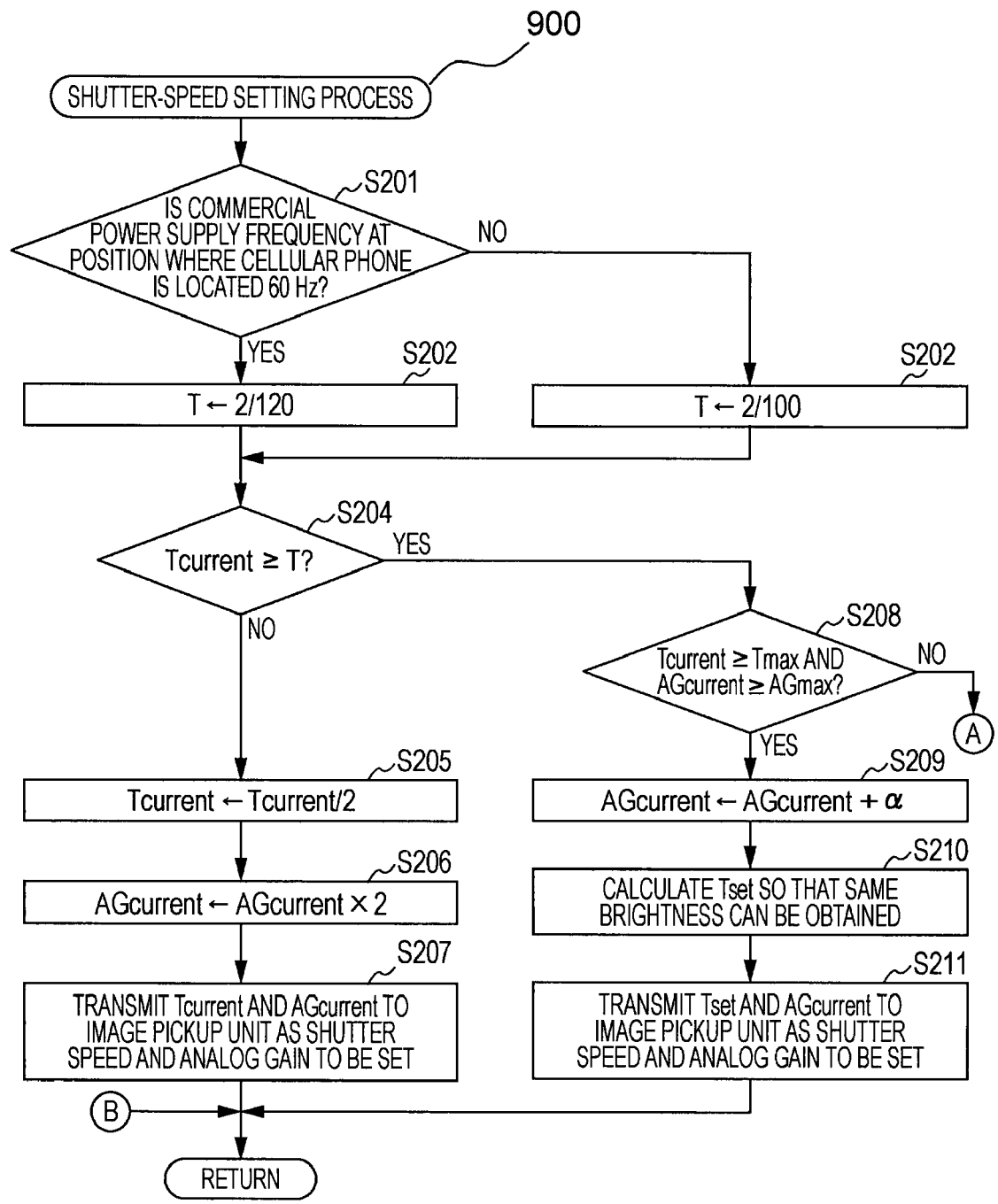
FIG. 4 illustrates a flowchart showing an exemplary shutter-speed setting process for reducing flicker according to an embodiment of the invention.
Figure 5:
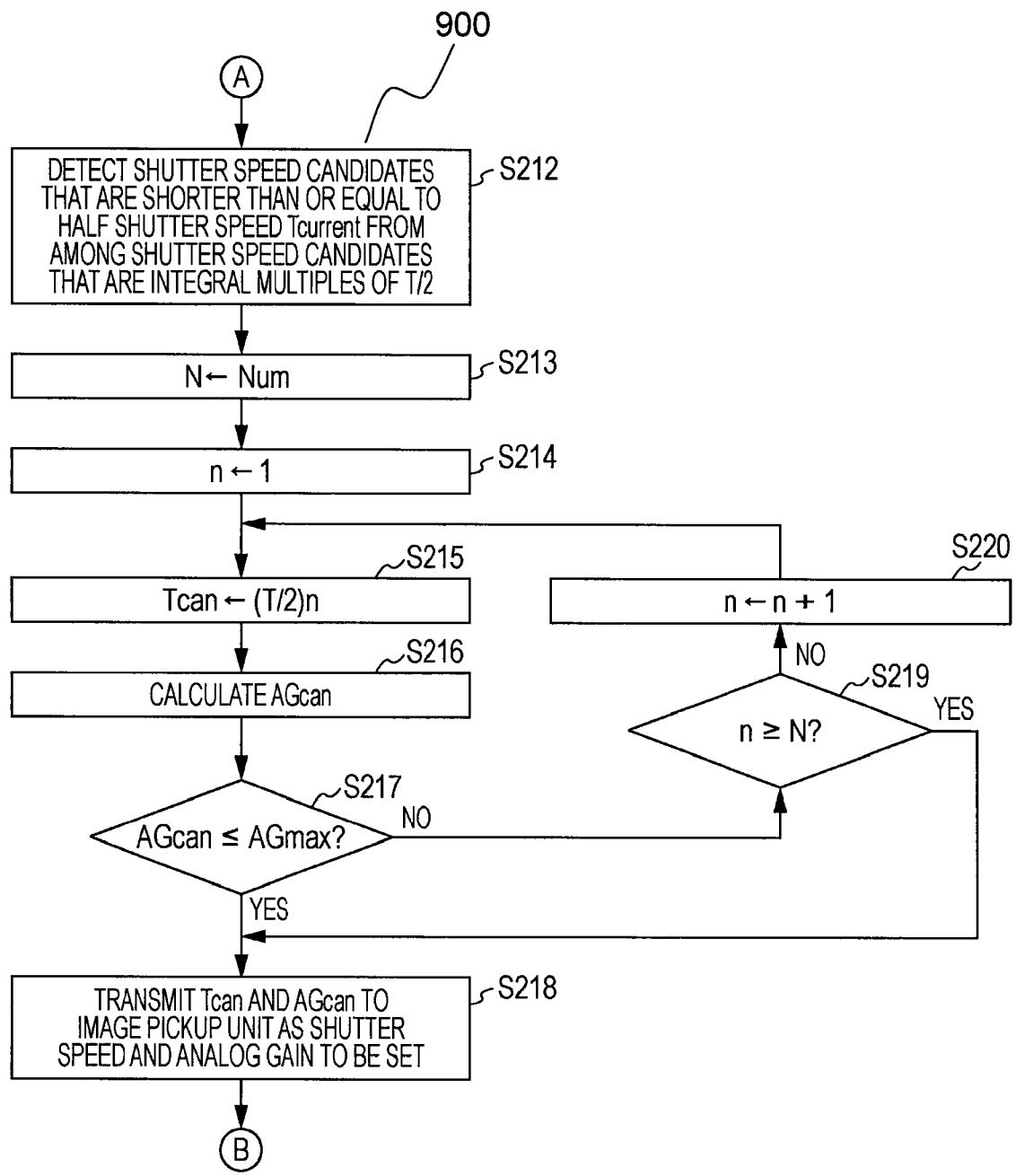
FIG. 5 illustrates a flowchart showing an exemplary shutter-speed setting process for reducing flicker according to an embodiment of the invention.

FIGS. 4 and 5 are flowcharts showing the shutter-speed setting processes 900 according to an embodiment of the invention. The various tasks performed in connection with processes 900 may be performed by software, hardware, firmware, or any combination thereof. For illustrative purposes, the following description of process 900 may refer to elements mentioned above in connection with FIGS. 1-2. In practical embodiments, portions of process 900 may be performed by different elements of the described device, e.g., the image pick up element 100, the buffer unit 200, the storage unit 300, the operation unit 400, the display unit 500, the communication unit 600, and the control unit 700. Process 900 may include any number of additional or alternative tasks. The tasks shown in FIGS. 4 and 5 need not be performed in the illustrated order, and process 900 may be incorporated into a more comprehensive procedures or processes having additional functionality not described in detail herein In the embodiment shown in FIGS. 4 and 5, "Tcurrent" represents a variable showing the shutter speed set in the image pickup element 102 when the shutter button is pressed, and "AGcurrent" represents a variable showing the analog gain set in the amplifying circuit 104 when the shutter button is pressed. In addition, "Tmax" represents the upper limit of the shutter speed (e.g., 1/10), and "AGmax" represents the upper limit of the analog gain (e.g., 80). Furthermore, "T" represents a variable for which 1/f is substituted after a commercial power supply frequency f is determined, "Num" represents the total number of shutter speed candidates that are half the shutter speed "Tcurrent" from among shutter speed candidates that are integral multiples of T/2, and "n" represents a variable specifying one of the shutter speed candidates (candidate shutter speed). Moreover, "α" represents an integer value (e.g., 90) to be added to "AGcurrent" so that the upper limit of the analog gain is exceeded on an exceptional basis. The value "α" is calculated in advance at a design stage in accordance with an allowable range of random noise. Furthermore, "Tset" represents the shutter speed corresponding to the analog gain after "α" is added to "AGcurrent".

The commercial power supply frequency determination part (determination part) 704 determines whether or not the commercial power supply frequency f at the position where the cellular phone 1 is located is 60 Hz (step S201). For example, if the image pickup element 102 is a complementary metal-oxide semiconductor (CMOS), the determination in step S201 is performed in accordance with whether or not flicker can be detected in an image captured at 60 Hz. Flicker may be, without limitation, identified (detected) through various signal transformations on the image to identify linear periodicity in the image.

If flicker is not detected, it is determined that the commercial power supply frequency f at the position where the cellular phone 1 is located is 60 Hz. If it is determined that the commercial power supply frequency f is 60 Hz (YES branch of inquiry step S201), 2/120 is substituted for the variable "T" (step S202).

However, if flicker is detected, it is determined that the commercial power supply frequency f at the position where the cellular phone 1 is located is 50 Hz. In a case where it is determined that the commercial power supply frequency f is 50 Hz (NO branch of step S201), 2/100 is substituted for the variable "T" (step S203).

After the value is substituted for the variable "T", the setting part 706 determines whether or not "Tcurrent" is equal to or longer than "T" (step S204). In this example, it is determined whether or not "Tcurrent" is equal to or longer than "T" (that is, 1/f). However, the value to be substituted for "T" is not necessarily 1/f. For example, if the shutter speed at the time of hand-shake correction is set to be shorter than a speed value that is one-third the shutter speed set in the image pickup element 102, 3/(2f) may be substituted for "T". The shutter speed can be set to any speed value by comparing the shutter speed at the time of hand-shake correction with the set shutter speed and determining to what extent the shutter speed is to be shortened.

If it is determined that "Tcurrent" is shorter than "T" (NO branch in inquiry step S204), the setting part 706 substitutes Tcurrent/2 for "Tcurrent" (step S205), and substitutes AGcurrent×2 for "AGcurrent" (step S206). If, it is not possible to set the shutter speed to be shorter than half the shutter speed "Tcurrent" and to be an integral multiple of 1/(2f), then, "Tcurrent" and "AGcurrent" are transmitted to the image pickup element 100 as the shutter speed and the analog gain to be set (step S207).

If it is determined that "Tcurrent" is equal to or longer than "T" (YES branch in step S204), it is determined whether or not "Tcurrent" is equal to or longer than "Tmax" and "AGcurrent" is equal to or more than "AGmax" (step S208).

If it is determined that "Tcurrent" is equal to or longer than "Tmax" and "AGcurrent" is equal to or more than "AGmax", the value obtained by adding "α" to "AGcurrent" is substituted for "AGcurrent" (step S209).

If "AGcurrent" is equal to or more than "AGmax" is, for example, a case where image capturing is performed outdoors at night or under the glare of a single miniature light bulb. In such a case, high priority is placed on brightening the screen even if a certain degree of random noise is generated. Thus, the analog gain is set to a value exceeding the upper limit on an exceptional basis.

In order for the image captured when the shutter button is pressed and the still image to have the same brightness, "Tset" corresponding to "AGcurrent" is calculated (step S210).

Then, "Tset" and "AGcurrent" are transmitted to the image pickup unit 100 as the shutter speed and the analog gain to be set (step S211).

If it is determined that "Tcurrent" is shorter than "Tmax" and "AGcurrent" is less than "AGmax" (NO branch of inquiry step S208), shutter speed candidates that are shorter than or equal to half the shutter speed "Tcurrent" are detected from among shutter speed candidates that are integral multiples of T/2 (step S212). However, a shutter speed to be detected is not necessarily shorter than or equal to half the shutter speed "Tcurrent". The shutter speed to be detected may be shorter than "Tcurrent".

The total number "Num" of the detected shutter speeds is substituted for the variable "N" (step S213), and "n" is initialized (step S214). Then, (T/2)n is substituted for "Tcan" (step S215), and "AGcan" (candidate analog gain) that is to be applied to an image captured at "Tcan" is calculated in such a manner that the image captured when the shutter button is pressed and the still image have the same brightness (step S216). The calculation in step S216 is performed in accordance with the ratio among "AGcurrent", "Tcan", and "Tcurrent".

Then, it is determined whether or not "AGcan" is less than or equal to "AGmax" (inquiry step S217). If it is determined that "AGcan" is less than or equal to "AGmax" (YES branch of step S217), "Tcan" and "AGcan" are transmitted to the image pickup unit 100 as the shutter speed and the analog gain to be set (step S218).

If it is determined that "AGcan" is more than "AGmax", it is determined whether or not "n" is equal to or greater than "N", that is, another shutter speed candidate exists (inquiry step S219).

If it is determined that "n" is smaller than "N", that is, another shutter speed candidate exists (NO branch of inquiry step S219), "n" is incremented by one (step S220). Then, the process 400 proceeds to step S215.

If it is determined that "n" is equal to or greater than "N", that is, no shutter speed candidate exists (YES branch of inquiry step S219), the process 400 proceeds to step S218.

As described above, according to an embodiment of the invention, it is determined whether or not the shutter speed (sec) at a time when a user pressed the shutter button is equal to or longer than 1/f. By performing this determination, it can be determined whether or not the shutter speed can be set to a speed value that is shorter than half the shutter speed "Tcurrent" and that is an integral multiple of 1/(2f), that is, whether or not processing for reducing flicker can be performed. In a case where it is determined that the shutter speed (sec) is equal to or longer than 1/f, the shutter speed is set to a speed value that is shorter than or equal to half the shutter speed when the shutter speed was pressed and that is an integral multiple of 1/(2f). By setting the shutter speed to an integral multiple of 1/(2f), if, for example, the image pickup element 102 is a CMOS, displacement in the start time of horizontal scanning can be reduced and the light intensity in the exposure time of each pixel can be maintained constant. Therefore, a captured image with reduced flicker can be acquired.

In addition, the upper limit of the analog gain is given, and the shutter speed is determined in such a manner that the analog gain does not exceed its upper limit. Accordingly, the shutter speed determined as described above can be used as the shutter speed when electronic hand-shake correction is performed. Therefore, since, for example, selecting a shutter speed for which the analog gain is excessively increased can be prevented, and the degradation in the image quality caused by amplification of the analog gain can be reduced when a still image is captured.

Furthermore, if the shutter speed calculated by the calculating circuit 103 is sufficiently short when the shutter button was pressed by the user, electronic hand-shake correction is not performed by the electronic hand-shake correction part 707 and a still image is captured at the shutter speed. Therefore, a sharp and high-quality still image with reduced shake can be obtained.

The analog gain to be applied to a still image represents the amplification factor indicating to what extent an image signal forming the still image is to be amplified.

According to various embodiments of the invention, the commercial power supply frequency f at the position where a cellular phone is located is determined in accordance with a captured image. However, the commercial power supply frequency f may be set in accordance with an input operation performed by a user. In the case of an image pickup apparatus having a global positioning system (GPS) function, the current position of the image pickup apparatus may be determined using the GPS function and the commercial power supply frequency f at the position where the image pickup apparatus is located may be determined in accordance with the current position.

Although one upper limit of the analog gain is given in the foregoing embodiment, a plurality of upper limits of the analog gain may be stored and one of the plurality of upper limits may be set in accordance with a user operation. Consequently, a user is able to select which one of an image with reduced hand shake and a high-quality image with reduced noise is provided with a higher priority.

According to embodiments of the invention, it is assumed that the cellular phone 1 is used in Japan and thus the commercial power supply frequency f may be 50 Hz or 60 Hz. However, if the cellular phone 1 is used outside Japan, the commercial power supply frequency f may be fixed (e.g., 50 Hz or 60 Hz).

In this way, embodiments of the invention correct flicker, which depends on a commercial power supply frequency f, under a circumstance in which a fluorescent lamp is used as a light source. As described above, if a commercial power supply frequency f is detected and the shutter speed (not shown) by an auto-exposure unit when a predetermined operation performed by a user is received is equal to or longer than a predetermined speed value (predetermined value), the shutter speed is set to a speed value that is an integral multiple of $1/(2f)$. Thus, a captured image with reduced flicker is obtained.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An image pickup apparatus comprising:
an image pickup element operable to capture a plurality of still images at a shutter speed to obtain captured images;
an auto exposure unit operable to calculate a calculated shutter speed;
a detection unit operable to detect a power supply frequency if the calculated shutter speed is longer or equal to a predetermined value;
a setting unit operable to set the shutter speed to a value equal to $N/(2f)$, where N is an integer and f is the power supply frequency detected by the detection unit, and shorter than the calculated shutter speed in response to a predetermined user operation, if the calculated shutter speed is longer than or equal to a predetermined value; and
a storage unit operable to store: an upper limit of the shutter speed, an upper limit of an analog gain, and a hand shake threshold value,
wherein the setting unit is further operable to calculate the analog gain to increase a brightness of the captured images to compensate for a decrease in brightness of the captured images due to a shortening of the shutter speed and the setting unit is further operable to calculate a candidate analog gain for each shutter speed that is equal to an integral multiple of $1/(2f)$ and is shorter than or equal to the upper limit of the shutter speed; and select a candidate shutter speed for which the candidate analog gain does not exceed the upper limit of the analog gain to obtain a selected shutter speed.

2. The image pickup apparatus according to claim 1, further comprising a correcting unit operable to perform an electronic hand-shake correction based on the captured images.

3. The image pickup apparatus according to claim 1, wherein the setting unit is further operable to set the shutter speed to the selected shutter speed when electronic hand-shake correction is performed.

4. The image pickup apparatus according to claim 1, further comprising a control unit configured to:
control the image pickup unit to capture a still image at the shutter speed; and
prevent the correcting unit from performing the electronic hand-shake correction, if the shutter speed is shorter than the hand shake threshold value.

5. The image pickup apparatus according to claim 1, wherein the predetermined value is 1/f.

6. A method for reducing flicker, the method comprising:
obtaining a calculated shutter speed;
detecting a power supply frequency if the calculated shutter speed is longer or equal to a predetermined value;
setting a shutter speed to a value equal to N/(2f), where N is an integer and f is the detected power supply frequency, and shorter than the calculated shutter speed if the calculated shutter speed is determined to be longer than or equal to the predetermined value;
capturing one or more still images at the shutter speed to obtain captured images;
storing an upper limit of the shutter speed and an upper limit of an analog gain;
calculating the analog gain to increase a brightness of the captured images to compensate for a decrease in brightness of the captured images due to a shortening of the shutter speed, wherein calculating the analog gain comprises calculating a candidate analog gain for each shutter speed equal to an integral multiple of 1/(2f) that does not exceed the upper limit of the shutter speed; and selecting a candidate shutter speed for which the candidate analog gain does not exceed the upper limit of the analog gain to obtain a selected shutter speed.

7. The method according to claim 6, further comprising: setting the shutter speed to the selected shutter speed, if an electronic hand-shake correction is performed.

8. A non-transitory computer readable medium having stored thereon one or more sequences of instructions for causing one or more microprocessors to perform the steps for reducing flicker, the steps comprising:
determining a power supply frequency;
obtaining a calculated shutter speed;
determining if the calculated shutter speed is longer or equal to a predetermined value;
setting a shutter speed to a value equal to N/(2f), where N is an integer and f is the determined power supply frequency, and shorter than the calculated shutter speed if the calculated shutter speed is determined to be longer than or equal to the predetermined value;
capturing one or more still images at the shutter speed to obtain captured images;
storing an upper limit of the shutter speed and an upper limit of an analog gain;
calculating the analog gain to increase a brightness of the captured images to compensate for a decrease in brightness of the captured images due to a shortening of the shutter speed, wherein calculating the analog gain comprises calculating a candidate analog gain for each shutter speed equal to an integral multiple of 1/(2f) that does not exceed the upper limit of the shutter speed; and selecting a candidate shutter speed for which the candidate analog gain does not exceed the upper limit of the analog gain to obtain a selected shutter speed.

9. The non-transitory computer readable medium according to claim 8, further comprising program code for performing an electronic hand-shake correction based on the captured images.

10. The non-transitory computer readable medium according to claim 8, further comprising program code for setting the shutter speed to the selected shutter speed, if an electronic hand-shake correction is performed.

* * * * *